H. J. RICKON.
FILM REEL.
APPLICATION FILED JULY 8, 1914.
1,135,846.
Patented Apr. 13, 1915.
2 SHEETS—SHEET 1.
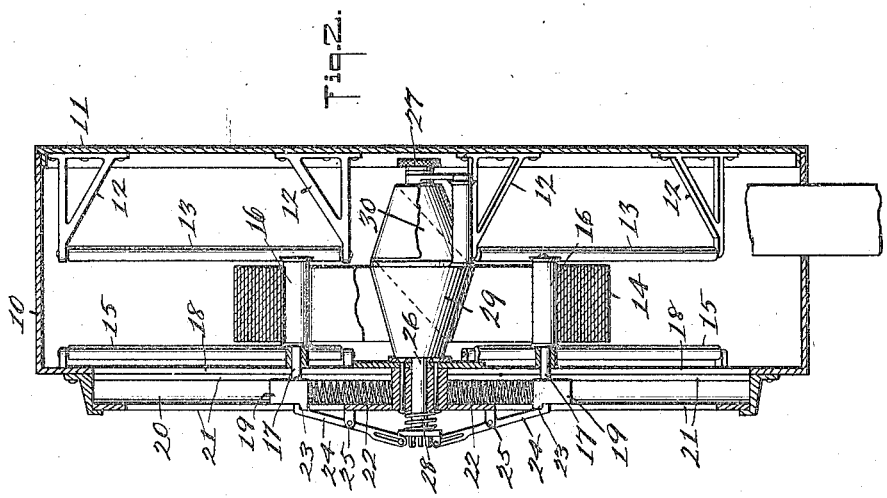
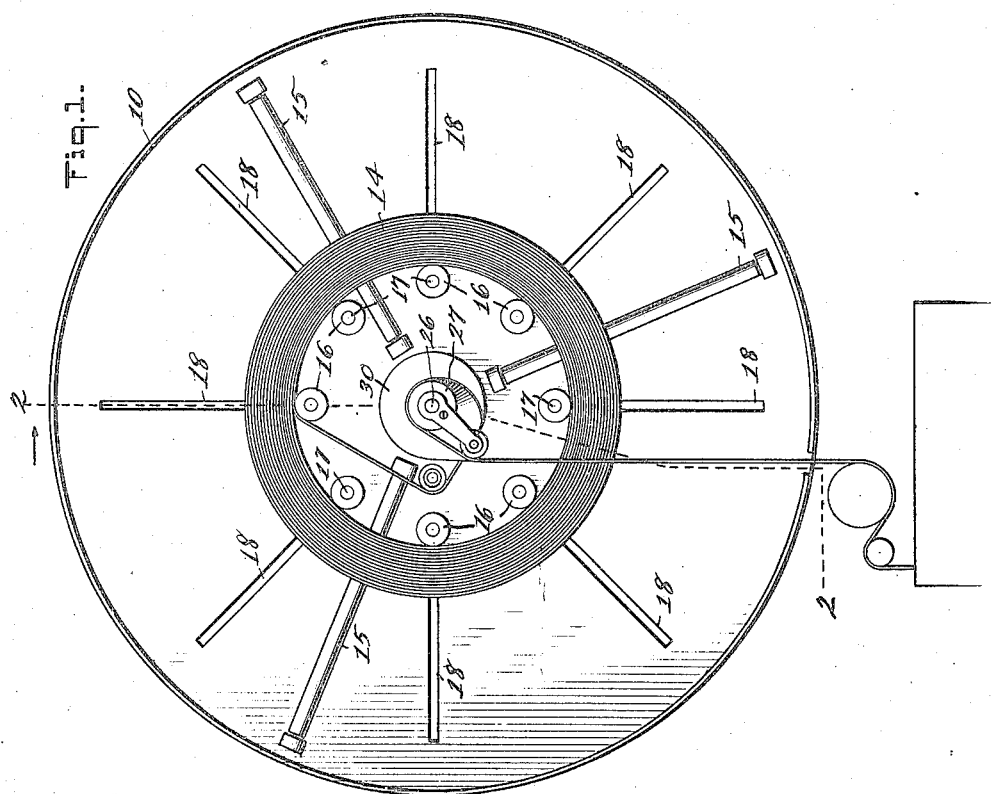
WITNESSES
INVENTOR
Harold J. Rickon
BY
ATTORNEYS H. J. RICKON.
FILM REEL.
APPLICATION FILED JULY 8, 1914.
1,135,846.
Patented Apr. 13, 1915.
2 SHEETS—SHEET 2.
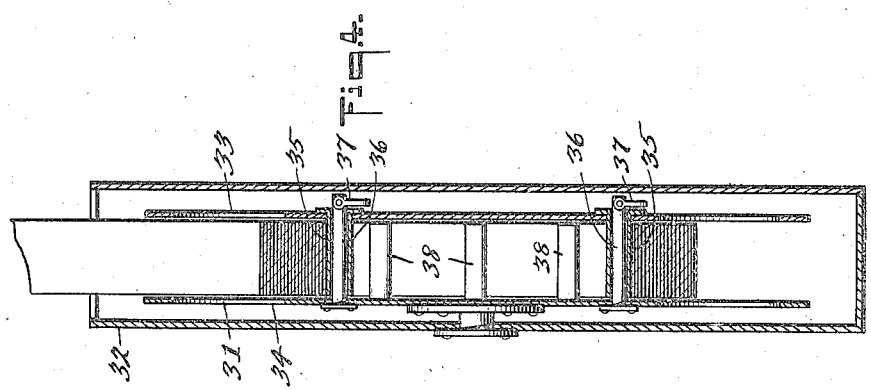
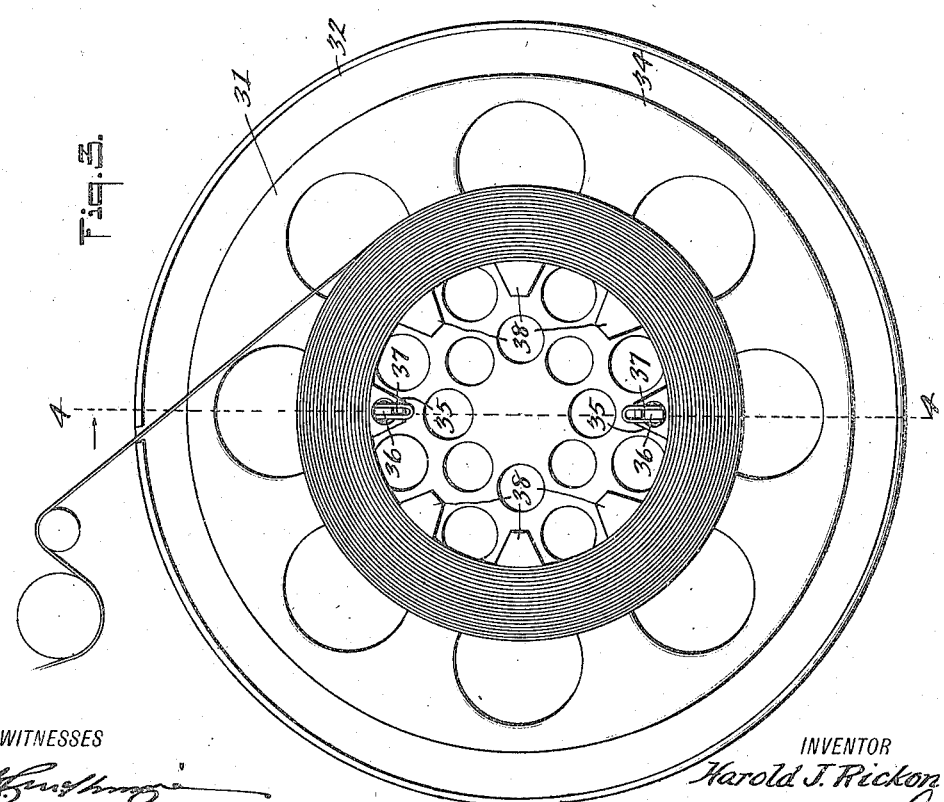
WITNESSES
INVENTOR
Harold J. Rickon
BY
ATTORNEYS

UNITED STATES PATENT OFFICE.

HAROLD J. RICKON, OF SAN FRANCISCO, CALIFORNIA, ASSIGNOR OF ONE-HALF TO EDWARD H. KEMP, OF SAN FRANCISCO, CALIFORNIA.

FILM-REEL.

1,135,846.

Specification of Letters Patent.

Patented Apr. 13, 1915.

Application filed July 8, 1914. Serial No. 849,732.

*To all whom it may concern:*

Be it known that I, HAROLD J. RICKON, a citizen of the United States, and a resident of San Francisco, in the county of San Francisco and State of California, have invented certain new and useful Improvements in Film-Reels, of which the following is a specification.

My invention relates to moving-picture projectors, more especially to the film magazines thereof, and the main object is to provide film magazines which dispense with the re-wind of the film after projection upon another spool now necessary to prepare the film for a subsequent projection.

A further object is to provide a lower or "take-up" reel or spool which is adapted to wind the film in the usual manner but from which the film, as rolled, may be removed to be placed in the upper magazine for another projection.

A further object is to provide a reel in the upper magazine from which the film may be unwound from the interior of the roll of film, thus starting projection with the beginning of the film which had been first wound on the take-up spool.

A further object is to provide a plurality of spring-actuated supporting posts for the roll of film in the upper spool, and also to provide means for locking said posts in their innermost positions to permit of a roll of film being placed thereover, means also being provided for releasing said lock to permit the posts to bear against the inner periphery of the film roll.

My invention is fully described in the following specification, of which the accompanying drawings form a part, in which the same parts are designated by the same reference characters in each of the views, and in which:—

Figure 1 is an interior view of my upper magazine spool, with the cover of the magazine removed; Fig. 2 is a section taken on the line 2—2 of Fig. 1; Fig. 3 is an interior view of the lower magazine spool, with the magazine cover removed; and Fig. 4 is a section taken on the line 4—4 of Fig. 3.

In the drawings forming a part of this application I have shown an upper magazine 10, having a cover 11 therefor, said cover carrying a plurality of interiorly directed brackets 12 serving as supports for a plurality of rollers 13 adapted to maintain the roll 14 of film in position, and in the bottom of the magazine. I provide a plurality of similar rollers 15 for the same purpose.

Extending across the space between the rollers 13 and 15 are a plurality of rotatable posts 16 arranged, each, upon a stub-shaft 17 projected through and slidable in corresponding radial slots 18 in the bottom or back of the magazine, said posts being carried by coresponding slides 19 within a compartment 20 also radially slotted as shown at 21, and each of said slides 19 is normally forced outwardly by means of a coil spring 22.

The slides 19 have, each, a small shoulder 23 thereon adapted to be engaged by the corresponding one of a plurality of arms 24 pivoted at 25 in the position of each slot 21, said arms being in pivotal connection with a rod 26 extending to the front of the magazine and being provided with a handle 27 whereby said rod may be moved longitudinally thereof, a coil spring 28 normally maintaining said rod in a rearward position whereby all of said arms are in position to serve as spring latches for the corresponding slides, to hold the same in their innermost positions with respect to their slots, for placing a roll of film over the posts 16 and, when said roll is so placed, the handle 27 may be drawn forwardly and the slides being released permit the posts to bear directly upon the inner periphery of the roll or film, resiliently.

Revolubly mounted upon the rod 26 is a double cone, 29 and 30 being designated as the cone surfaces thereof, and it will be noted that the magazine 10 is of a depth slightly greater than double the width of the film therein, said film being removed from the interior of the roll thereof, which is adjacent the back of the magazine, but being drawn from said magazine adjacent the cover 11, as clearly shown in Fig. 2.

The film end, interior of the roll thereof, is drawn out and passed around the cone surface 29 which materially changes the direction of the path thereof, being at a decided angle to the plane of the roll of film, thus carrying it over to a point where it is again wrapped around the cone surface 30 and, said cone surfaces being of the same angularity with respect to the axis thereof, the subsequent path of the film is parallel to the initial path but in a different plane, as clearly shown, this permitting film withdrawal from the roll at its interior periphery without interruption throughout the length of said film. The film is then threaded through the projector, not shown, and passed to the "take-up" reel 31 within the magazine 32, said reel or spool consisting of two members, a front 33 and a rear 34, clearly shown in Fig. 4, the former having two, or more, tubes 35 on the interior side thereof adapted to be slid over two, or more, rods 36 fixed in the latter member, a suitable catch 37 preventing the accidental removal of the said tubes from the rods, and the rear member 34 is also provided with a plurality of concentrically arranged posts 38 around which the film is wound in the revolution of the take-up reel, and the diameter of an imaginary outer periphery of the posts 38 is greater than that of the imaginary outer periphery of the posts 16 whereby, when a roll of film is removed from the posts 38 it may be easily slipped over the posts 16 when locked in their innermost positions as described, after which the latch thereof is released and the posts 16 bear on the inner periphery of the roll of film, ready for another projection. It will thus be seen that not only is one-half the time now necessary for projection and re-wind of a subject saved, but wear and tear on the film itself is avoided to this extent, thereby increasing the life thereof and, thus, its value, and the removal of the roll of film from the "take-up" reel is very quick and easy, as is also its positioning in the upper or feed magazine, and neither magazine detracts from the appearance of the projector, nor to its ordinary use, neither does my invention add materially to the weight, size, or cost thereof.

My invention is very simple though efficient, and avoids the relatively long waits between subjects now common in theaters of this class, and, while I have shown a present preferred form of construction, I do not limit myself thereto but may make changes thereover and modifications thereof, within the scope of the following claims, without departing from the spirit of my invention, or sacrificing its advantages.

Having fully described my invention, what I claim as new, and desire to secure by Letters Patent, is:—

1. In a moving picture projector; a feed reel, having a roll of film thereon, a plurality of radially movable posts for maintaining said roll in position, a casing for said reel provided with a cover and having a film outlet slot arranged adjacent said cover, said reel being arranged adjacent the rear of said casing, and a double cone for guiding said film from said roll to said outlet.

2. In a moving picture projector; a feed reel, having a roll of film thereon, a plurality of spring-actuated, radially movable posts thereon for maintaining said roll in position, means for locking said posts in their innermost positions, and means for guiding said film from the interior of said roll.

3. In a moving picture projector; a feed reel having a roll of films thereon, a plurality of spring-actuated, radially movable posts thereon for maintaining said roll in position, means for locking said posts in innermost positions, means for releasing said lock, and means for guiding said film from the interior of said reel.

4. In a moving picture projector; a feed reel, comprising a central shaft, a plurality of radially movable posts adapted to receive a roll of film, a cone on said shaft, within said roll of film, inwardly tapered toward the support for said posts, and a cone on said shaft inwardly tapered in a reverse direction to said first named cone, said film being led from the interior of said roll partially around said first named cone to direct the same from said roll of film, and partially around said last named cone to direct said film into a path parallel to but at a distance from the roll of film.

In testimony whereof I have signed my name, in presence of the subscribing witnesses, to this specification.

HAROLD J. RICKON.

Witnesses:
D. B. RICHARDS,
PETER A. PESHON.